US008108662B2

(12) United States Patent
Darrington et al.

(10) Patent No.: US 8,108,662 B2
(45) Date of Patent: *Jan. 31, 2012

(54) CHECKPOINTING A HYBRID ARCHITECTURE COMPUTING SYSTEM

(75) Inventors: David L Darrington, Rochester, MN (US); Matthew W Markland, Rochester, MN (US); Philip James Sanders, Rochester, MN (US); Richard Michael Shok, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/248,277

(22) Filed: Oct. 9, 2008

(65) Prior Publication Data
US 2010/0095100 A1 Apr. 15, 2010

(51) Int. Cl.
*G06F 11/28* (2006.01)
(52) U.S. Cl. ...................................................... 712/228
(58) Field of Classification Search .................. None
See application file for complete search history.

(56) References Cited

U.S. PATENT DOCUMENTS

| | | | |
|---|---|---|---|
| 5,146,460 A * | 9/1992 | Ackerman et al. .............. 714/33 |
| 7,293,200 B2 | 11/2007 | Neary et al. | |
| 7,305,582 B1 | 12/2007 | Moser et al. | |
| 7,487,393 B2 | 2/2009 | Archer et al. | |
| 7,543,180 B2 | 6/2009 | Gross et al. | |
| 7,721,176 B2 * | 5/2010 | Jung et al. ...................... 714/741 |
| 7,779,298 B2 | 8/2010 | Challenger et al. | |
| 7,849,450 B1 * | 12/2010 | Rydh et al. ..................... 717/131 |
| 7,865,346 B2 * | 1/2011 | Gunther et al. .................. 703/13 |
| 2003/0188278 A1 * | 10/2003 | Carrie ............................... 716/4 |
| 2003/0191615 A1 * | 10/2003 | Bailey et al. ..................... 703/13 |
| 2005/0034014 A1 | 2/2005 | Moser et al. | |
| 2007/0074135 A1 * | 3/2007 | Craig et al. ........................ 716/5 |
| 2008/0021692 A1 * | 1/2008 | Chaudhry et al. .............. 703/18 |
| 2008/0195847 A1 | 8/2008 | Wu et al. | |
| 2008/0244354 A1 | 10/2008 | Wu et al. | |

OTHER PUBLICATIONS

U.S. Patent and Trademark Office, Notice of Allowance issued in related U.S. Appl. No. 12/248,314 dated Sep. 14, 2010.

* cited by examiner

*Primary Examiner* — Eric Coleman
(74) *Attorney, Agent, or Firm* — Wood, Herron & Evans LLP

(57) ABSTRACT

A method, apparatus, and program product checkpoint an application in a parallel computing system of the type that includes a plurality of hybrid nodes. Each hybrid node includes a host element and a plurality of accelerator elements. Each host element may include at least one multi-threaded processor, and each accelerator element may include at least one multi-element processor. In a first hybrid node from among the plurality of hybrid nodes, checkpointing the application includes executing at least a portion of the application in the host element and at least one accelerator element and, in response to receiving a command to checkpoint the application, checkpointing the host element separately from the at least one accelerator element.

25 Claims, 7 Drawing Sheets

CHECKPOINTING A HYBRID ARCHITECTURE COMPUTING SYSTEM

CROSS-REFERENCE TO RELATED APPLICATIONS

This application is related to U.S. patent application Ser. No. 12/248,314 to Darrington et al., entitled "Checkpointing a Hybrid Architecture Computing System" (now issued as U.S. Pat. No. 7,873,869 and filed on even date herewith, which application is incorporated by reference herein.

FIELD OF THE INVENTION

The present invention relates to computing systems, and more particularly to checkpointing hybrid architecture computing systems.

BACKGROUND OF THE INVENTION

Computing technology has advanced at a remarkable pace, with each subsequent generation of computing system increasing in performance, functionality, and storage capacity, often at reduced cost. However, despite these advances, many scientific and business applications still demand massive computing power, which can only be met by extremely high performance computing systems. One particular type of computing system architecture that is often used in high performance applications is a parallel processing computing system.

Generally, a parallel processing computing system comprises a plurality of homogeneous computing nodes and is configured with a distributed application. Some parallel processing computing systems may have hundreds or thousands of individual computing nodes. Each computing node is generally of modest computing power and typically includes one or more single-core processing units, or computing cores. As such, each computing node may be a computing system configured with an operating system and distributed application. The distributed application provides work for each computing node and is operable to control the workload of the parallel processing computing system. Generally speaking, the distributed application provides the parallel processing computing system with a workload that can be divided into a plurality of jobs. Typically, each computing node, or each computing core, is configured to process one job and therefore process, or perform, a specific function. Thus, the parallel processing architecture enables the parallel processing computing system to receive a workload, then configure the computing nodes to cooperatively perform one or more jobs such that the workload supplied by the distributed application is processed substantially in parallel. Some parallel processing computing systems are generally based on the BlueGene computing system architecture as developed by International Business Machines ("IBM") of Armonk, N.Y., and as is well known in the art.

Parallel processing computing systems have found application in numerous different computing scenarios, particularly those requiring high performance. For instance, airlines rely on parallel processing to process customer information, forecast demand, and decide what fares to charge. The medical community uses parallel processing computing systems to analyze magnetic resonance images and to study models of bone implant systems. As such, parallel processing computing systems typically perform most efficiently on work that contains several computations that can be performed at once, as opposed to work that must be performed serially. The overall performance of the parallel processing computing system is increased because multiple computing cores can handle a larger number of tasks in parallel than could a single computing system. Other advantages of some parallel processing computing systems include their scalable nature and their modular nature.

Conventional parallel processing computing systems are generally used to process work that often requires long runtimes. However, as the size of the parallel processing computing system increases, the mean time between failures for that parallel processing computing system typically increases faster than the decrease in the time required to process the work. More simply put, as more components are added to the parallel processing computing system, there is generally less time between failures of components even though the runtime for work decreases. Thus, when a parallel processing computing system reaches a large size, the average runtime for work often exceeds the mean time between failures for that parallel processing computing system. As such, work with long runtimes often fails to complete. One solution to this problem generally includes periodically checkpointing the parallel processing computing system such that the work may be restarted and continued from a known point. Checkpointing generally includes bringing the parallel processing computing system to a known state, saving that state, then resuming normal operations. Thus, time, money, and effort are typically expended that could otherwise be used for processing work.

However, conventional parallel processing computing systems are often large and expensive to implement, often using tens of thousands of homogenous nodes that are typically configured to perform only one task. One recent improvement has been to use hybrid computing nodes to implement hybrid architecture parallel processing computing systems. In hybrid architecture parallel processing computing systems, the hybrid computing nodes typically include a combination of a host and at least one accelerator element. Each host element typically includes at least one multithreaded processor and manages at least one accelerator element, while each accelerator element typically includes at least one multi-element processor to perform work. In many cases, each hybrid node includes a host element and multiple accelerator elements of a different processing architecture, which are specifically designed or optimized to handle specific problems or tasks. As such, the hybrid nodes of hybrid architecture parallel processing computing systems are typically able to process many tasks at once, thus processing work faster and more efficiently than the homogeneous nodes of conventional parallel processing computing systems. Therefore, hybrid architecture parallel processing computing systems typically provide many times the raw processing power of conventional parallel processing computing systems with fewer processors, less space, less heat, and lower overall cost.

However, checkpointing hybrid architecture parallel processing computing systems is often more complex than checkpointing conventional parallel processing systems. For example, a computing node of a conventional parallel processing system is often configured to perform one task, while a hybrid node of a hybrid architecture parallel processing system may be configured to perform multiple tasks simultaneously, including at least one task per core or thread of the multithreaded and/or multi-element processors of that hybrid node. Conventional applications for hybrid architecture parallel processing systems, however, may be unaware of the multithreaded and/or multi-element processors, and/or threads and elements thereof, and thus be unaware of where, exactly, a task is being processed. Moreover, as multithreaded and/or multi-element processors typically complete work in an asynchronous manner, it is often difficult to predict or ascertain the particular state of a task at any given time. Thus, conventional checkpointing of hybrid architecture parallel processing computing systems typically remains inefficient and wasteful, as an entire hybrid architecture parallel processing computing system may have to be halted so as to bring the system to a known state.

Consequently, there is a need to checkpoint an application of a hybrid architecture parallel processing computing system in such a manner that accounts for the hybrid nature of the computing nodes and brings the application to a known state.

SUMMARY OF THE INVENTION

Embodiments of the invention provide for a method, apparatus, and program product to address checkpointing issues that arise when checkpointing an application configured across a hybrid architecture parallel processing system. In particular, embodiments of the invention provide for checkpointing a host element and at least one accelerator element of a hybrid node separately, while alternative embodiments of the invention provide for checkpointing the host element in response to checkpointing the at least one accelerator element of the hybrid node. Typically, checkpointing issues arise based upon the configuration of the application across the host element and at least one accelerator element. Embodiments of the invention thus provide for checkpointing the application to avoid checkpointing issues that may arise by configuring the application across the host element and at least one accelerator element.

In one embodiment consistent with aspects of the invention, the application is checkpointed in a parallel computing system of the type that includes a plurality of hybrid nodes. Each hybrid node includes a host element and a plurality of accelerator elements, and each host element includes at least one multithreaded processor. In a first hybrid node from among the plurality of hybrid nodes, checkpointing the application includes executing at least a portion of the application in the host element and at least one accelerator element and, in response to receiving a command to checkpoint the application, checkpointing the host element separately from the at least one accelerator element.

In that embodiment, checkpointing the host element may include waiting to complete all tasks of the at least one accelerator element prior to saving checkpoint data for the host element. Checkpointing the host element may also include prohibiting new tasks from being scheduled on the at least one accelerator element prior to saving checkpoint data for the host element. In some embodiments, waiting to complete all tasks of the at least one accelerator element includes monitoring the at least one accelerator element to determine when the at least one accelerator element has completed all tasks. In those embodiments, checkpointing the host element is performed in response to the completion of all the tasks of the at least one accelerator element.

In some embodiments, checkpointing the host element of the first hybrid node includes quiescing communications between the host element of the first hybrid node and a second host element of a second hybrid node among the plurality of hybrid nodes prior to saving checkpoint data for the host element of the first hybrid node. In those embodiments, checkpointing the host element of the first hybrid node may include waiting to complete all tasks of the at least one accelerator element prior to saving checkpoint data for the host element of the first hybrid node.

Furthermore, in some embodiments, checkpointing the host element includes checkpointing the at least one accelerator element prior to saving checkpoint data for the host element. Checkpointing the at least one accelerator element may thus include temporarily saving checkpoint data for that at least one accelerator element in the host element, or temporarily saving checkpoint data for the at least one accelerator element in the respective accelerator element. In some embodiments, checkpointing the at least one accelerator element includes suspending the execution of the application on the at least one accelerator element prior to saving checkpoint data for the at least one accelerator element. In those embodiments, checkpointing the host element may further includes quiescing communications between the host element of the first hybrid node and a second host element of a second hybrid node among the plurality of hybrid nodes prior to saving checkpoint data for the host element of the first hybrid node. As such, the execution of the application on the host element may be suspended in response to receiving the command to checkpoint the data of the application and prior to saving checkpoint data for the host element of the first hybrid node.

In some embodiments, checkpointing the host element further includes suspending the execution of the application on the host element in response to receiving the command to checkpoint the data of the application and prior to saving checkpoint data for the host element. Also in some embodiments, checkpointing the host element includes saving checkpoint data for the host element in a host element checkpoint file. Moreover, in various embodiments, checkpointing the host element separately from each of the accelerator elements in response to the command includes saving checkpoint data for the at least one accelerator element in an accelerator element checkpoint file or includes saving checkpoint data for the host element and the at least one accelerator element in a hybrid node checkpoint file.

In some embodiments, the first hybrid node may be assigned a state value that indicates that the host element is attempting to quiesce communications between the host element of the first hybrid node and a second host element of a second hybrid node among the plurality of host elements prior to saving checkpoint data for the host element of the first hybrid node.

In some embodiments, the checkpoint data for the host element includes state data and a memory of each multithreaded processor of the host element, and wherein checkpoint data for the at least one accelerator element includes state data and a memory of each general purpose processing element and each synergistic processing element of each multi-element processor of the at least one accelerator element.

In some embodiments, each accelerator element includes at least one multi-element processor, each multi-element processor further including at least one general purpose processing element and a plurality of synergistic processing elements.

In an alternative embodiment consistent with aspects of the invention, the application is checkpointed in a parallel computing system of the type that includes a plurality of hybrid nodes. Each hybrid node includes a host element and a plurality of accelerator elements, and each host element includes at least one multithreaded processor. The method includes, in a first hybrid node among the plurality of hybrid nodes, executing at least a portion of the application in the host element and at least one accelerator element. The method further includes, in the first hybrid node, waiting to complete all tasks of the at least one accelerator element in response to a command to checkpoint the data of the application and waiting to complete all tasks of the host element in response to the command. The at least one accelerator element is checkpointed in response to completing all tasks of the at least one accelerator element, and the host element is checkpointed in response to completing all tasks of the host element and in response to quiescing communications between the host element of the first hybrid node and a second host element of a second hybrid node among the plurality of hybrid nodes. In that embodiment, each accelerator element may include at least one multi-element processor, and each multi-element processor may include at least one general purpose processing element and a plurality of synergistic processing elements.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
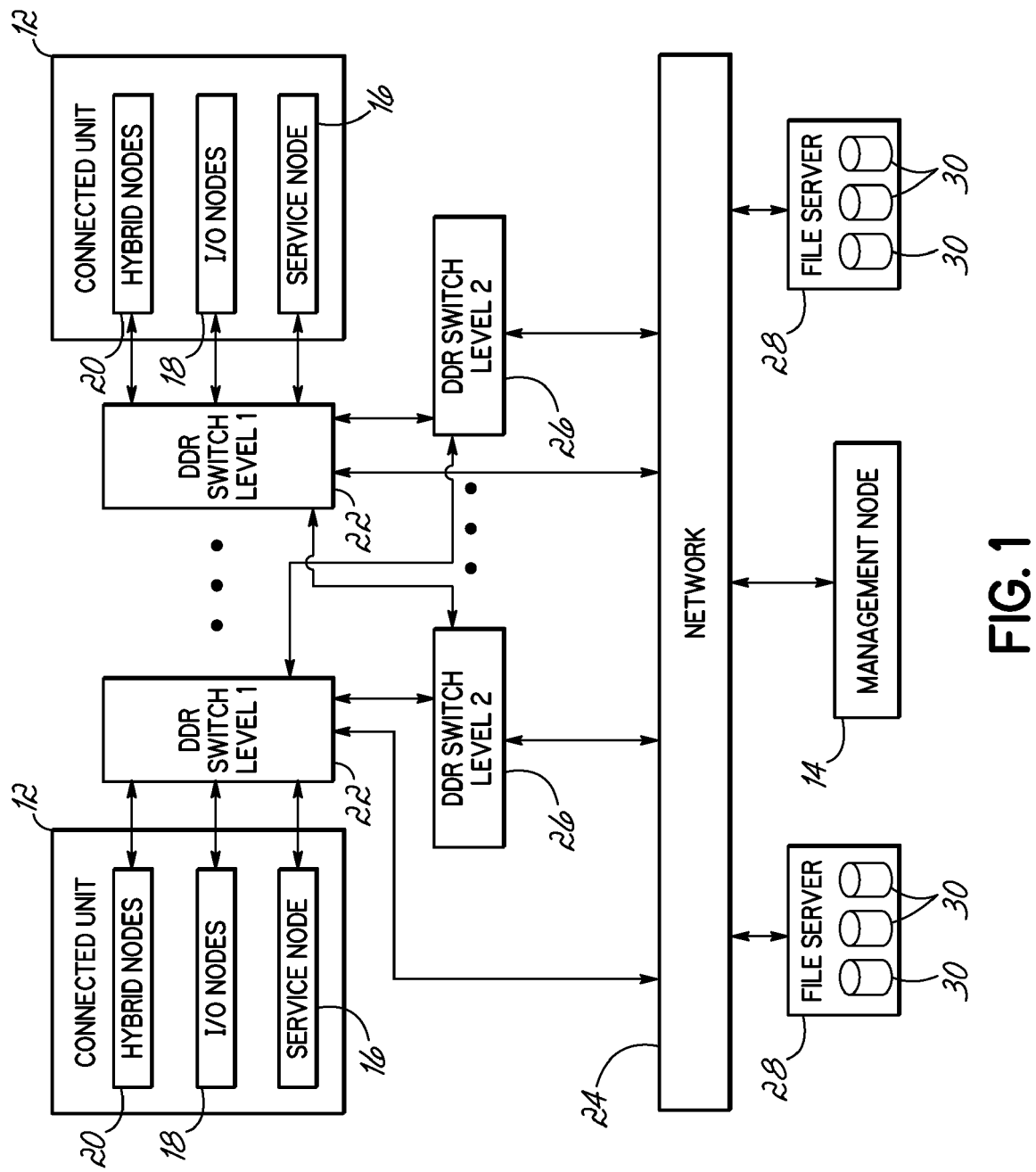
FIG. 1 is a diagrammatic illustration of a hybrid architecture parallel processing computing system consistent with embodiments of the invention.

Embodiments of the present invention include a method, apparatus, and program product to checkpoint an application in a hybrid architecture parallel processing computing system.

Hybrid architecture parallel processing computing systems, such as the RoadRunner system created by International Business Machines, often include a cellular hybrid node structure. As discussed below in detail, the RoadRunner system is built from various nodes collected into connected units that may be connected to each other through various double-data rate switches and/or networks. The system may be constructed with a plurality of hybrid nodes, which include a host element and at least one accelerator element.

The hybrid architecture parallel processing computing system is configured to receive a workload and divide the workload into parts, or tasks, that are operable to be executed, or processed, primarily by the hybrid nodes. In particular, the tasks may be further subdivided to be processed by the host element and/or at least one accelerator element, and may be further subdivided to be processed by the one or more cores of a multithreaded processor of the host element and/or one or more elements of a multi-element processor of the at least one accelerator element. As such, the parallel processing computing system is configured to perform several computations at once. In particular, each synergistic processing element and/or general purpose processing element of a multi-element processor may execute one task, depending on the configuration of the hybrid architecture parallel processing computing system. The at least one multithreaded processor of the host element and the at least one multi-element processor of the at least one accelerator element may be coupled to respective memories, which may each be configured with an application, or a portion of an application. For example, an application may be configured on the host element and dispatch at least one task or workload to at least one application configured to execute on an accelerator element. In particular, the application may be executed by a general purpose processing element of a multi-element processor on the accelerator element, which may in turn configure and manage the execution of at least one task on at least one synergistic processing element of the multi-element processor. One of ordinary skill in the art will appreciate that alternate configurations may be used without departing from the scope of the invention.

Embodiments consistent with the invention may checkpoint the application by checkpointing the host element and the at least one accelerator element separately. In one embodiment, the host element and the at least one accelerator element are separately checkpointed by checkpointing only the host element, and thus ignoring the at least one accelerator element. In that embodiment, the host element may wait to complete at least one task of the at least one accelerator element prior to the checkpointing the host element. In another embodiment, the host element and the at least one accelerator element are separately checkpointed by checkpointing the host element and the at least one accelerator element independently. In that embodiment, the at least one accelerator element is suspended and checkpointed in response to receiving a command to checkpoint. Thus, the host element may be checkpointed when the at least one accelerator element is suspended or the host element may wait to checkpoint until the at least one accelerator element has completed the at least one task. In yet another embodiment, the host element and the at least one accelerator element are separately checkpointed by collectively checkpointing the hybrid node, which may be a first hybrid node among a plurality of hybrid nodes. In that embodiment, the at least one accelerator element is suspended and checkpointed in response to receiving a command to checkpoint and the host element may wait for communications between that first hybrid node and a second hybrid node to quiesce before checkpointing.

Additionally, embodiments consistent with the invention may checkpoint the application by executing at least a portion of the application in the host element and at least one accelerator element in a first hybrid node, waiting for at least one task of the at least one accelerator element of the first hybrid node to complete in response to a command to checkpoint the data of the application, waiting for the at least one task of the host element of the first hybrid node to complete in response to the command, checkpointing the at least one accelerator element of the first hybrid node in response to completing the at least one task of the at least one accelerator element, checkpointing the host element of the first hybrid node in response to completing at least one task of the host element of the first hybrid node and in response to quiescing communications between the host element of the first hybrid node and a second host element of a second hybrid node among the plurality of hybrid nodes.

Hardware and Software Environment

Turning to the drawings, wherein like numbers denote like parts throughout several view, FIG. 1 is a diagrammatic illustration of a hybrid architecture parallel processing computing system ("system") 10 that includes a plurality of connected units 12 managed by a management node 14. Each connected unit 12 of the system may include a service node 16, at least one I/O node 18, and a plurality of hybrid compute nodes 20 (illustrated, and referred to, as "hybrid nodes" 20). Additionally, each service node 16, I/O node 18, and hybrid node 20 in a connected unit 12 may be in turn coupled to a first level double-data rate switch 22 ("first level DDR switch" 22) configured to communicate with the management node 14 through a network 24.

In some embodiments, the system 10 may include up to about 3240 hybrid nodes 20, up to about 216 I/O nodes 18, and up to about eighteen service nodes 16 distributed about evenly throughout up to about eighteen connected units 12 (e.g., each connected unit includes 180 hybrid nodes 20, twelve I/O nodes 18, and one service node 16). As such, and in some embodiments, the system 10 may include includes up to about eighteen first level DDR switches 22. To communicate between each connected unit 12, each first level DDR switch 22 may be connected to each of about eight second level DDR switches 26. In some embodiments, each first level DDR switch 22 may be connected through about twelve connections to each of the second level DDR switches 26. Therefore, in some embodiments, each first level DDR switch may be operable to make in excess of about two-hundred connections. In specific embodiments, each first level DDR switch 22 may be a model no. ISR 9288 IB4x DDR switch with 288 ports as distributed by Voltaire, Inc., of Billerica, Mass. Similarly, and in specific embodiments, each second level DDR switch 26 may also be a model no. ISR 9288 IB4x DDR switch with 288 ports as distributed by Voltaire. In this manner, any connected unit 12, and in particular any of its associated nodes (e.g., service node 16, I/O nodes 18, and/or hybrid nodes 20) may communicate with any other connected unit 12 and it associated nodes through the first and second DDR switches 22, 26 in a manner well known in the art. Therefore, and in some embodiments, the system 10 may have an architecture consistent with a RoadRunner computing system architecture, as developed by International Business Machines, Inc. ("IBM") of Armonk, N.Y. In specific embodiments, the system 10 may have an architecture consistent with a RoadRunner Phase III computing system architecture, as also developed by IBM.

The service node 16 for each connected unit 12 is configured to receive at least one task, job, or workload from the management node 14. As such, the service node 16 may include databases and administrative tools for its associated connected unit 12. The databases may maintain state information for the connected unit 12, including the current scheduling of tasks across the hybrid nodes 20 as well as which I/O nodes 18 control the communications for which hybrid nodes 20, while the administrative tools may control the scheduling and loading of programs, workloads, parts of workloads, execution contexts, tasks, data, and jobs onto the hybrid nodes 20, including loading applications, programs, workloads, parts of workloads, execution contexts, tasks, data, and jobs onto each hybrid node 20. As such, each service node 16 may, in some embodiments, gather a subset of hybrid nodes 20 (i.e., a "group" of hybrid nodes 20) from the connected unit 12 and dispatch at least one task, job, workload, part of a workload, execution context, or program to that group of hybrid nodes 20 for execution. Hereinafter, a collection of tasks, a collection of jobs, a collection of execution contexts, a workload, part of a workload, or program to be executed by a hybrid node 20 or a group of hybrid nodes 20 will be referred to as a "workload" for the sake of brevity. Individual instances of work, such as individual tasks, jobs, execution contexts, or other individual pieces of work will be referred to as a "task" for the sake of brevity. Each workload may be communicated across the first DDR switch 22 and through the I/O nodes 18 to a hybrid node 20. As such, each service node 16 controls the operation of the connected unit 12 upon which it is configured, and the management node 14 controls the operation of the plurality of service nodes 16 of the connected units 12.

Each I/O node 18 may be configured to provide communications for a group of hybrid nodes 20, thus allowing the hybrid nodes 20 to otherwise devote resources that normally would be used for I/O operations to workloads. In some embodiments, each I/O node 18 is configured to provide communications for about fifteen hybrid nodes 20. As such, the I/O nodes 18 in a connected unit 18 may provide the internal communications for each connected unit 18, as well as provide the hybrid nodes 20 access to at least one file server 28 configured across the network 24. In some embodiments, the nodes 16, 18, 20 of a connected unit 12 may be configured in a virtual local area network ("VLAN") as is well known in the art. As such, connected units 12 may be dispersed across one or more geographically distant cabinets, rooms, and/or data centers. In some embodiments, a file server 28 may provide files, information, or other data to each connected unit 12 and the management node 14. In specific embodiments, each file server 28 may be a server that provides interfaces to various storage devices, such as, for example, disk drives 30, other I/O devices, resources, or components that may be used to process a workload.

Figure 2:
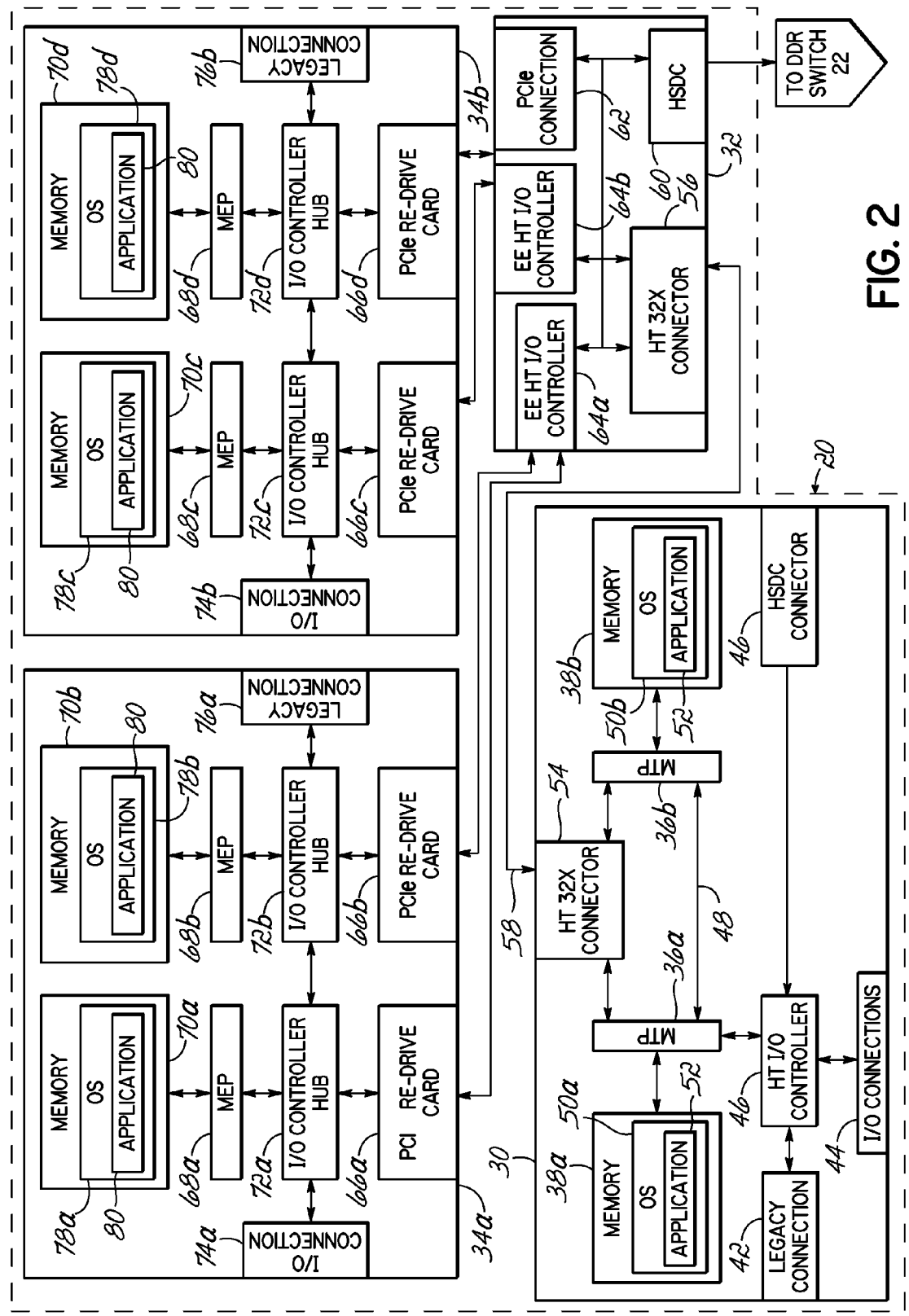
FIG. 2 is a block diagram showing the hardware and software components of one embodiment of a hybrid node of the system of FIG. 1.

FIG. 2 is a diagrammatic illustration of a hybrid node 20 consistent with embodiments of the invention. In some embodiments, each hybrid node 20 includes a host element 30, an expansion element 32, and a plurality of accelerator elements 34a, 34b. As illustrated in FIG. 2, the hybrid node 20 includes two accelerator elements 34a, 34b. In some embodiments, the host element 30 communicates with the accelerator elements 34a, 34b and the first DDR switch 22 through the expansion element 32.

The host element 30 includes at least one multithreaded processor ("MTP") 36a, 36b, each MTP 36a, 36b coupled to a respective memory 38a, 38b, and at least one HyperTransport ("HT") I/O controller 40 coupled to at least one legacy connection 42, at least one I/O connection 44, and a high speed daughter card ("HSDC") connector 46. As illustrated in FIG. 2, the HT I/O controller 40 is coupled to MTP 36a. In specific embodiments, each HT I/O controller 40 may be a model no. HT-2000 I/O controller with support for up to four connections as distributed by Broadcom Co. ("Broadcom") of Irvine, Calif.

As illustrated in FIG. 2, the host element 30 includes two MTPs 36a, 36b and two memories 38a, 38b. In some embodiments, each MTP 36a and 36b may communicate through a host element HT link 48. In some embodiments, the host element HT link 48 may be about sixteen bits wide. In some embodiments, each MTP 36a, 36b is a multiple core processing unit, and in specific embodiments may be an Opteron dual core processor as distributed by Advanced Micro Device, Inc. ("AMD"), of Sunnyvale, Calif. Each memory 38a, 38b may include random access memory devices (including synchronous dynamic random access memory), cache memories, non-volatile memories, and read-only memories. In specific embodiments, the size of each memory 38a, 38b may be about sixteen gigabytes. As such, and in specific embodiments, the host element 30 may be a BladeCenter LS21 as distributed by IBM.

Each memory 38a, 38b of each host element 30 may be configured with at least one operating system 50a, 50b, respectively, to execute at least one application 52. Each operating system 50a, 50b may be a simplified-function operating system configured to manage a workload, split a workload into at least one task, perform at least one task, maintain the application 52, manage the respective accelerator elements 34a, 34b, and/or perform other functions. However, each operating system 50a, 50b may not, and advantageously does not, include certain functions normally associated with a typical personal computing operating system, including software, routines, components, or program code to support various I/O devices, error diagnostics and recovery, etc. In specific embodiments, each operating system 50a, 50b may include a simplified version of a Unix-like operating system, such as Linux. It will be appreciated by one having ordinary skill in the art that other operating systems may be used, and that it is not necessary that all nodes 14, 16, 18 and 20, or elements 30, 34a, and 34b employ the same operating system. As such, the application 52 may be a "multi-platform" application and operable to be installed across multiple and different operating systems or operating environments. Thus, the application 52 may be configured to communicate with other applications (e.g., other instances of the same application 52, or other applications configured to interoperate with application 52), including applications that may be configured on the management node 14, service nodes 16, I/O nodes 18, other hybrid nodes 20, other host elements 30, and/or other accelerator elements 34a, 34b of the system 10. Local copies of data for each application 52, or data from each application 52, may be reserved in some portion of memory 38a, 38b in a file cache (not shown).

To communicate with the expansion elements 32, the host element 30 may include two host element sixteen-bit HT connectors (collectively shown as "HT 32x Connector 54") as well known in the art. Correspondingly, the expansion element 32 may also include two expansion element sixteen-bit HT connectors (collectively shown as "HT 32x connector 56"). Thus, the host element 30 may communicate with the expansion element 32 through two sixteen-bit HT links to form a thirty-two bit HT signal link 58.

The expansion element 32 is configured to act as a bridge between HT and peripheral component interconnect express ("PCIe") communication, and couple with the first DDR switch 22 through an HSDC card 60. Additionally, the expansion element 32 may couple to another network through a PCIe connection 62. The expansion element 32 communicates to the accelerator elements 34a, 34b through respective expansion element HT I/O controllers 64a, 64b ("EE" HT I/O controllers 64a, 64b) configured to connect to at least one PCIe Re-drive card 66 configured on each accelerator element 34a, 34b. In specific embodiments, each EE HT I/O controller 64a, 64b may couple to about two PCIe ports and be a model no. HT-2100 I/O HT-to-PCIe bridge as distributed by Broadcom, while each accelerator element 34a, 34b may include about two PCIe Re-drive cards 66a, 66b and 66c, 66d, respectively, as are well known in the art. As such, the expansion element 32 may communicate with the host element 30 through the HT 32x connector 56, communicate with the first DDR switch 22 through the HSDC card 60, and communicate with the accelerator elements 34a, 34b through respective EE HT I/O controllers 64a, 64b.

Each accelerator element 34a, 34b may include at least one multi-element processor ("MEP") 68 coupled to an accelerator element memory 70, and at least one I/O controller hub ("I/O hub") 72, accelerator element I/O connection 74, and legacy connection 76. As illustrated in FIG. 2, each accelerator element 34a, 34b includes about two respective PCIe Re-drive cards 66a, 66b and 66c, 66d, about two respective MEPs 68a, 68b and 68c, 68d, two respective accelerator element memories 70a, 70b and 70c, 70d, about two respective I/O hubs 72a, 72b and 72c, 72d, about one respective accelerator element I/O connection 74a, 74b, and about one respective legacy connection 76a, 76b. Thus, the hybrid node 20 includes about four PCIe Re-drive cards 66a-d, about four MEPs 68a-d, about four respective memories 70a-d, about four I/O hubs 72a-d, about two accelerator element I/O connections 74a, 74b, and about two legacy connections 76a, 76b. In some embodiments, each PCI Re-drive card 66a-d is coupled to a respective I/O hub 72a-d. The I/O hubs 72a, 72b and 72c, 72d in each respective accelerator element 34a, 34b are configured to communicate with each other (e.g., I/O hub 72a is configured to communicate with I/O hub 72b, while I/O hub 72c is configured to communicate with I/O hub 72d), while one I/O hub 72a, 72c in each respective accelerator element 34a, 34b is coupled to the respective accelerator element I/O connection 74a, 74b (e.g., to control and interface with I/O devices, such as USB devices), and the other I/O hub 72b, 72d is coupled to the respective legacy connection 76a, 76b.

In some embodiments, each MEP 68a-d may be a multi-element architecture processor that includes at least one general purpose processing element and a plurality of synergistic processing elements, such as a Cell Broadband Engine Architecture processor as jointly developed by IBM, Sony Computer Entertainment of Tokyo, Japan, and Toshiba of Tokyo, Japan. In specific embodiments, each MEP 68a-d may be a PowerXCell 8i processor as distributed by IBM. Each accelerator element memory 70a-d may include random access memory devices (including synchronous dynamic random access memory), cache memories, non-volatile memories, and read-only memories. In specific embodiments, the size of each accelerator element memory 70a-d may be about eight gigabytes. As such, and in specific embodiments, each accelerator element 34a, 34b may be a BladeCenter QS22 as distributed by IBM.

Each accelerator element memory 70a-d may be configured with at least one operating system 78a-d operable to execute an application 80 to perform a task. Each operating system 78a-d may be a simplified-function operating system that includes state data for maintaining the processing state(s) of its respective MEP 68a-d. As such, and in some embodiments, the operating systems 78a, 78b and 78c, 78d of the respective accelerator elements 34a, 34b are operable to support the operation of the respective MEPs 68a-d and may include specific libraries, data, routines, and/or components to perform at least one task on the processing elements of the respective MEPs 68a-d. In specific embodiments, each operating system 78a-d may include a simplified version of a Unix-like operating system, such as Linux, and may be the same or a different, operating system as that configured on the host element. In further specific embodiments, each operating system 78a-d may include libraries, references, routines, components, and/or other data for the application 80 to process a workload into at least one task executable by the general purpose processing element and/or the plurality of synergistic processing elements of each respective MEP 68a-d. Furthermore, the application 80 may be a "multi-platform" application and may be the same, or a different, application 80 as the application 52 configured on the host element 30. Local copies of data for the application 80, or data from the application 80, may be reserved in some portion of a respective accelerator element memory 70a-d in a file cache (not shown). Each accelerator element memory 70a-d may also include an application stack (not shown) that includes data corresponding to the execution progress of a task or tasks being processed on the respective MEPs 68a-d.

Figure 3:
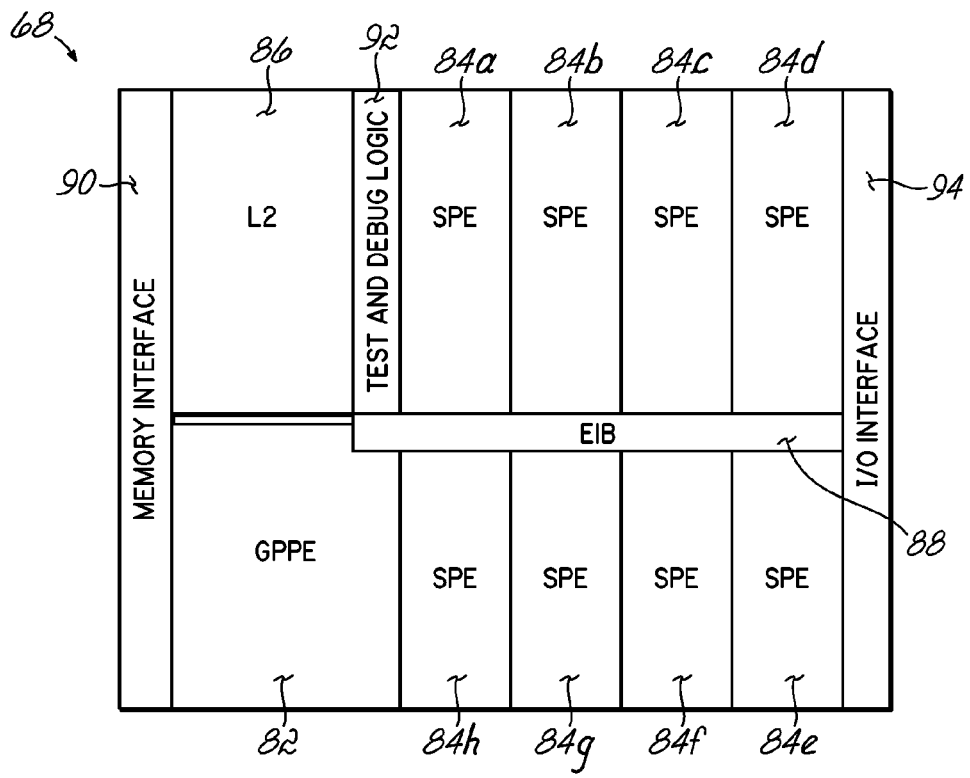
FIG. 3 is a block diagram showing the hardware components of a multi-element processor of the hybrid node of FIG. 2.

FIG. 3 is a diagrammatic illustration of components of an MEP 68 consistent with embodiments of the invention. In some embodiments, each MEP 68 includes a general purpose processing element ("GPPE") 82 and a plurality of synergistic processing elements ("SPEs") 84a-h. In the illustrated embodiment of FIG. 3, the MEP 68 is consistent with the architecture of a PowerXCell 8i MEP processor with a single GPPE 82 and eight SPEs 84a-h. In alternative embodiments, an MEP 68 having two or more GPPEs 82 and a greater or lesser number of SPEs 84a-h may be used without departing from the scope of the invention.

In some embodiments, a GPPE 82 acts as a controller for each SPE 84a-h. The GPPE 82 may be a single or multi-threaded general operations processor and configured to process requests from an operating system 78 or application 80 and schedule a workload on that GPPE 82, or schedule one or more tasks on that GPPE 82 and/or across the SPEs 84a-h. In specific embodiments, the GPPE 82 may be a sixty-four-bit Power Architecture core (e.g., such as a Power ISA 2.0X compliant core) with virtual machine extensions ("VMX"), while each SPE 84a-h may be a 128-bit single instruction, multiple data architecture processing element. As such, the GPPE 82 may be used for executing the application 80, maintaining a task queue of the MEP 68, scheduling tasks across the SPEs 84a-h, performing general processing, processing at least one task, managing a workload, and monitoring the progress of operations of the SPEs 84a-h, while also being able to perform virtualization, address translation and protection, and external exception handling. The SPEs 84a-h, on the other hand, may be optimized for efficient data processing and devote most of their resources to computations and performing one task. Thus, each SPE 84a-h may be specialized for a specific task. For example, one or more SPEs 84a-h may be designed to function as a graphics engine, an encryption/decryption engine, or a co-processor. Also for example, one or more SPEs 84a-h may be designed for accelerated multimedia processing, or be dedicated to vector, scalar, fixed point, or floating point mathematical calculations.

Each SPE 84a-h may fetch or receive a task from the GPPE 82, execute it, and synchronize with the GPPE 82 once execution is complete. SPEs 84a-h may also be configured to run distinct parts of the application 80, engage in stream processing, and/or allow explicit scheduling for that SPE 84a-h. Because they are processing elements, each GPPE 82 may be configured with one or more logical caches (e.g., including an L2 cache 86), and each SPE 84a-h may be configured with one or more logical caches (not illustrated). As such, the GPPE 82 and each of the SPEs 84a-h is configured with at least some memory that, in some embodiments, may be checkpointed.

The MEP 68 includes a specialized high-speed element interconnect bus ("EIB") 88 to interconnect the GPPE 82 and SPEs 84a-h. The EIB 88 may be configured as a circular bus having two channels in opposite directions and connected to a memory interface 90, test and debug logic 92, and an I/O controller 94. Thus, and referring to FIG. 2, each MEP 68a-d may interface with its associated accelerator element memory 70a-d and I/O hub 72a-d. Referring back to FIG. 3, the GPPE 82 may load or collect data, instructions, and/or tasks for each of the SPEs 84a-h, as well as interface externally, through the EIB 88.

In some embodiments, an application 80 may not be configured with information about the various components of an MEP 68, including the GPPE 82 and SPEs 84a-h of an MEP 68. As such, the GPPE 82 may perform management functions of that MEP 68 and schedule and manage one or more tasks across one or more SPEs 84a-h. However, when an application 80 is configured with information about the various components of the MEP 68, the application 80 may manage the execution progress and scheduling of tasks on the GPPE 82 and/or at least one SPE 84a-h.

Figure 4:
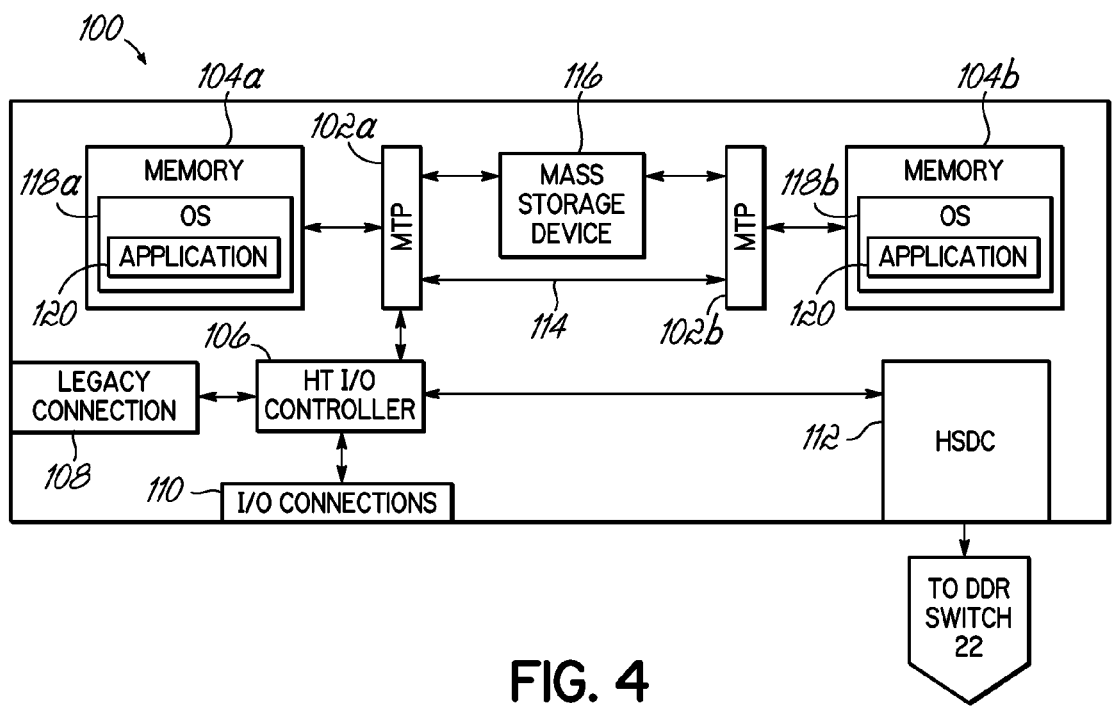
FIG. 4 is a block diagram showing the hardware and software components of a computing node of the system of FIG. 1.

FIG. 4 is a diagrammatic illustration of a computing node ("node") 100 that may be used as a management node 14, service node 16, or I/O node 18 consistent with embodiments of the invention. The node 100, much like the host element 30 of FIG. 2, includes at least one MTP 102a, 12b, each MTP 102a, 12b coupled to a respective node memory 104a, 104b, and at least one HT I/O controller 106 coupled to at least one legacy connection 108, at least one I/O connection 110, and an HSDC 112. As illustrated in FIG. 4, the HT I/O controller 106 is coupled to MTP 102a. In specific embodiments, each HT I/O controller 106 may be a model no. HT-2000 I/O controller with support for up to four connections as distributed by Broadcom.

As illustrated in FIG. 4, the node includes two MTPs 102a, 102b and two respective node memories 104a, 104b. In some embodiments, each MTP 102a, 102b may communicate with each other through a node HT link 114. In some embodiments, each MTP 102a, 102b is a multiple core processing unit, and in specific embodiments may be an AMD Opteron dual core processor as distributed by AMD. Each node memory 104a, 104b may include random access memory devices (including synchronous dynamic random access memory), cache memories, non-volatile memories, and read-only memories. Node memory 104a, 104b can additionally be part of its respective MTP 102a, 102b, or located elsewhere in the node, such as in a mass storage device 116 or as another node coupled to node 100 through a first DDR switch 22, a second DDR switch 26, and/or the network 24 (for example, in file server 28 and/or disk 30). In specific embodiments, the node 100 may be an I/O node 18 configured without the mass storage device 116. In alternative embodiments, the node 100 may be a service node 16 configured with the mass storage device 116 to store information about the service node 16 itself, the I/O nodes 18, the hybrid nodes 20, and/or other components of the system 10. In those alternative embodiments, the service node 16 may store checkpoint information of the hybrid nodes 20. In specific embodiments, the node 100 may be a BladeCenter LS21 with a mass storage device 116 as distributed by IBM.

Each memory 104a, 104b may be configured with at least one respective operating system 118a, 118b to execute an application 120 to execute at least one task. Each operating system 11 8a, 11 8b may be a simplified-function operating system that includes state data for maintaining the processing state(s) of the node 100, other nodes 14, 16, 18, and/or 20 of the system 10, or communications to and/or from the node 100. In some embodiments, each operating system 118a, 118b is operable to support the operation of the node 100 and communicate with other nodes 14, 16, 18, and/or 20 of the system 10, as opposed to multi-tasking operating systems configured on a typical personal computing system. In specific embodiments, each operating system 118a, 118b may include a simplified version of a Unix-like operating system, such as Linux, similar to the operating systems 50a, 50b configured on the host element of FIG. 2. Returning to FIG. 4, the application 120 may be a "multi-platform" application and operable to be installed across multiple and different operating systems 118a, 118b or operating environments. When configured on an I/O node 18, the application 120 may be configured to track and manage the communications of the hybrid nodes 20 and/or service node 16 of a connected unit 12 with themselves, other connected units 12, and networked components such as the management node 14 and file server 28. When configured on a server node 16, the application 120 may be configured to monitor the process of one or more hybrid nodes 20, as well as manage the workloads of a connected unit 12 and the couplings of the I/O nodes 18 to the hybrid nodes 20. The node 100 may communicate with the first DDR switch 22 through the HSDC 112.

In light of the foregoing, and referring to FIGS. 1-4, each hybrid node 20 may be a PowerXCell 8i/AMD TriBlade as distributed by IBM. Each host element 30 MTP 36a, 36b may control a respective accelerator element 34a, 34b. In some embodiments, MTP 36a manages MEPs 68a and 68b, while MTP 36b manages MEPs 68c and 68d. Each GPPE 82 of each MEP 68a-d controls up to about eight SPEs 84a-h. Furthermore, each MTP 36a, 36b may be coupled to a respective memory 38a, 38b that includes an operating system 50a, 50b and application 52 configured to provide tasks to the respective accelerator elements 34a, 34b. In turn, each accelerator element 34a, 34b may include at least one operating system 78a, 78b and 78c, 78d, and application 80 for each respective MEP 68a, 68b and 68c, 68d. Thus, the management node 14 may provide a workload to a service node 16 of a connected unit 12. The service node 16, in turn, may provide at least a portion of the workload to at least one hybrid node 20 through at least one I/O node 18. In turn, the host element 30 of the at least one hybrid node 20 may receive that portion and further divide that portion into at least one accelerator element workload. The host element 30 may provide that at least one accelerator element workload to at least one accelerator element 34, which may in turn process at least one task of the at least one accelerator element workload with at least one MEP 68. The at least one MEP 68 may process that at least one task with the GPPE 82 and/or at least one SPE 84. When processing of that at least one task is complete, or as the processing of individual tasks by the at least one SPE 84 completes, the results may be monitored and/or gathered by the application 80 and provided to the host element 30, which may in turn be provided to the service node 16, which may ultimately be provided to the management node 14. Thus, the system 10 may be a RoadRunner parallel computing system architecture as developed by IBM that processes tasks in parallel using a plurality of hybrid nodes 20.

Those skilled in the art will recognize that the environments illustrated in FIGS. 1-4 are not intended to limit the present invention. In particular, while the nodes 14, 16, 18, 20 of the system 10 of FIG. 1 are shown connected to each other and other connected units 12 through a plurality of first and/or second DDR switches 22, 26, any combination of local area networks ("LANs"), wide area networks ("WANs") and/or other networking topologies known in the art may alternatively be used. Moreover, while the management node 14 and file servers 28 are shown coupled to the network 24, one having ordinary skill in the art will appreciate that they may instead be coupled directly to a first and/or second DDR switch 22, 26. Indeed, those having skill in the art will recognize that other alternative hardware and/or software environments may be used without departing from the scope of the invention. For example, the system 10 may include one or more additional servers (including one or more terminal servers), switches (including one or more additional DDR switches as distributed by Voltaire, and/or different types of switches such as, for example, one or more TeraScale model no. E1200 as distributed by Force10 of San Jose, Calif.), management modules, displays, user inputs and/or components without departing from the scope of the invention.

Additionally, one having ordinary skill in the art will recognize that the exemplary environment for a Cell-based architecture illustrated in FIG. 3 is not intended to limit the present invention. Though not shown in FIG. 3, for instance, one skilled in the art will appreciate that more than one GPPE 82, and more or fewer SPEs 84a-h may be included within other embodiments of an MEP 68. As such, other alternative hardware environments may be used without departing from the scope of the invention.

Furthermore, the applications 52, 80, and 120 illustrated throughout FIG. 2 and FIG. 4 may be the same application, separate applications of a software suite, different applications configured to communicate with each other, or different applications that perform different functions and do not intercommunicate. As such, the system 10 may be configured with one, or more, applications to process a workload, as well as schedule and process tasks, which will be referred to herein as "application" or "applications."

Moreover, one having ordinary skill in the art will recognize that a "host element" may include not only host element 30 of a hybrid node 20, but also may include an MTP 36a, 36b of the host element 30 or a core of an MTP 36a, 36b. As such, one skilled in the art will appreciate that in specific examples a host element may include, for example, a BladeCenter LS21 server, an Opteron dual core processor, or a core of the Opteron dual core processor. Similarly, one having ordinary skill in the art will recognize that an "accelerator element" may include not only accelerator element 34a or 34b of the hybrid node 20, but also may include an MEP 68 of an accelerator element 34a, 34b, a GPPE 82 of an MEP 68, or a GPPE 82 and at least one SPE 84a-h of an MEP 68, or an SPE 84a-h of an MEP 68. In addition, one having ordinary skill in the art will recognize that an accelerator element 34 of a hybrid node 20 may include only one PCI Re-drive card 66, one MEP 68, one accelerator element memory 70, one I/O hub 72, one accelerator element I/O connection 74, one legacy connection 76, one operating system 78, and one application 80. As such, one skilled in the art will appreciate that in specific examples an accelerator element may include, for example, a BladeCenter QS22 server, a PowerXCell 8i processor, a portion of a GPE of a PowerXCell 8i processor, a portion of a GPPE and at least one SPE of a PowerXCell 8i processor, or at least one SPE of a PowerXCell 8i processor.

The routines executed to implement the embodiments of the invention, whether implemented as part of an operating system or a specific application, component, program, object, module or sequence of instructions executed by one or more nodes 14, 16, 18, and 20 will be referred to herein as "computer program code," or simply "program code." The computer program code typically comprises one or more instructions that are resident at various times in various memory and storage devices in the system 10, and that, when read and executed by one or more processors of the system 10, cause that system to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 5:
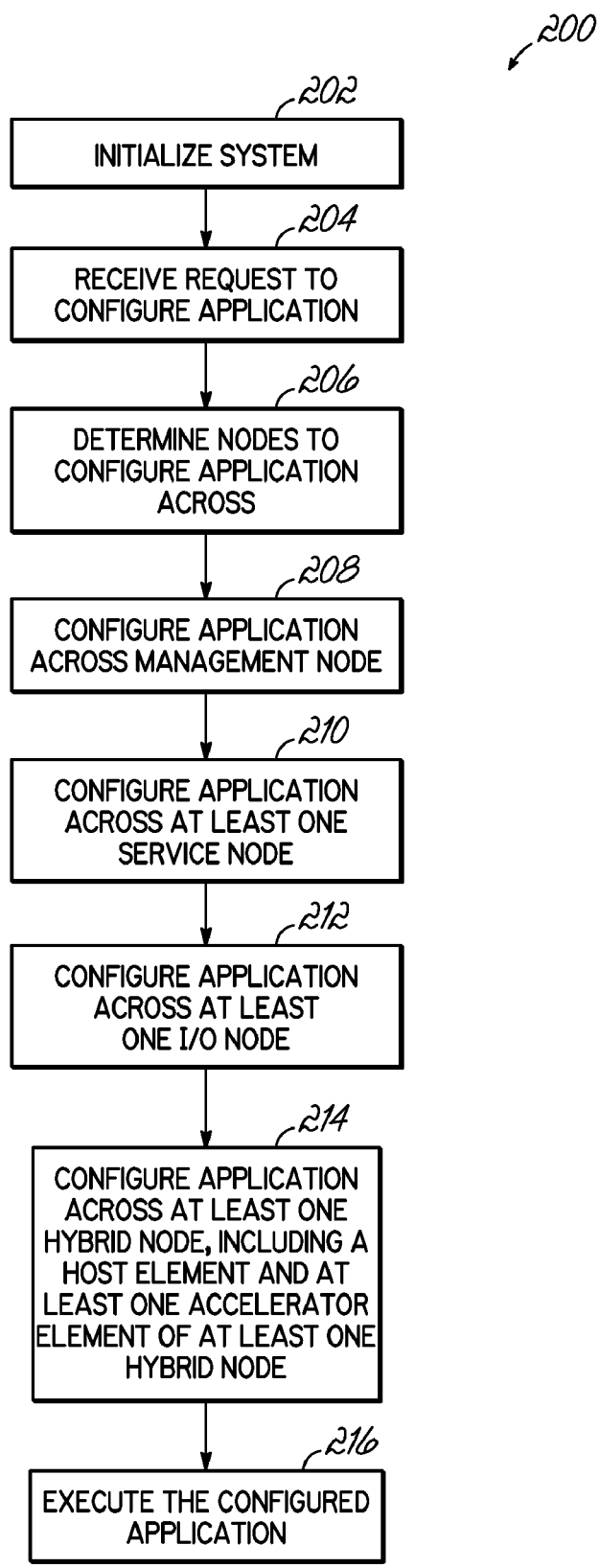
FIG. 5 is a flowchart illustrating blocks executable by the system of FIG. 1 to configure an application across that system.

FIG. 5 is a flowchart 200 illustrating blocks of program code executable by a hybrid architecture computing system ("system") consistent with that illustrated throughout FIGS. 1-4 to configure an application across that system. After initialization of the system (block 202), a user may interact with a management node of the system to request configuration of an application across the system (block 204). Alternatively, the user may programmatically request to configure the application across the system, such as through an automatic request after initialization of the system. In some embodiments, the program code may receive, along with the request, one or more particular connected units, as well as one or more particular service nodes, I/O nodes, and hybrid nodes of a connected unit, to configure the application across. Thus, the program code may attempt to configure the application across one or more connected units in whole and/or in part.

In response to receiving the request to configure the application (block 204), the program code may determine the nodes, including at least one service node, at least one I/O node, and at least one hybrid node, to configure the application on (block 206). In some embodiments, the program code may receive an indication of which nodes to configure the application across when it receives the request to configure that application. In alternative embodiments, the program code may determine the nodes to configure the application across from a file, such as a configuration file disposed within the system. In further alternative embodiments, the program code may determine the nodes to configure the application across based on which nodes are currently free, or otherwise configured with no, or very few, applications.

The program code may begin the configuration of the application by configuring the application on the management node (block 208) and at least one service node (block 210). In some embodiments, each management node and service node is configured to support one or more applications. Thus, and in some embodiments, the system may support multiple applications running at the same time. To configure the application across a connected unit of the system, the program code may configure the application on at least one I/O node (block 212) and at least one hybrid node (block 214). Similarly to the management and service nodes, the I/O nodes and hybrid nodes may also be configured to support one or more applications. When configuring the application across a hybrid node, the program code configures the application across a host element and at least one accelerator element of that hybrid node (block 214). In specific embodiments, the application may be configured on at least one memory for at least one respective MTP of the host element and configured on at least one accelerator element memory for at least one respective MEP of the at least one accelerator element. Thus, the program code may configure the application on a management node, service node, at least one I/O node, and at least one hybrid node. As such, the system may execute the application on those nodes (block 216).

Work may be entered for the application at the management node. The work may be divided into at least one connected unit workload that may be distributed to at least one service node. A service node may in turn divide the connected unit workload into at least one workload configured to be executed by a hybrid node, and distribute the at least one workload to at least one hybrid node. The workload may be received at a host element of the hybrid node. The host element, in turn, may send the workload to an accelerator element, divide the workload into a plurality of accelerator element workloads and send those accelerator element workloads to the accelerator elements, divide the workload into at least one task and send the at least one task to at least one accelerator element, or combinations thereof. The accelerator elements, in turn, may receive the workload, at least one accelerator element workload, or at least one task. The GPPE of an accelerator element may thus divide a workload or accelerator element workload into one or more tasks, or receive the at least one task, and schedule the at least one task or the one or more tasks across the SPEs of the MEP of the accelerator element.

Figure 6:
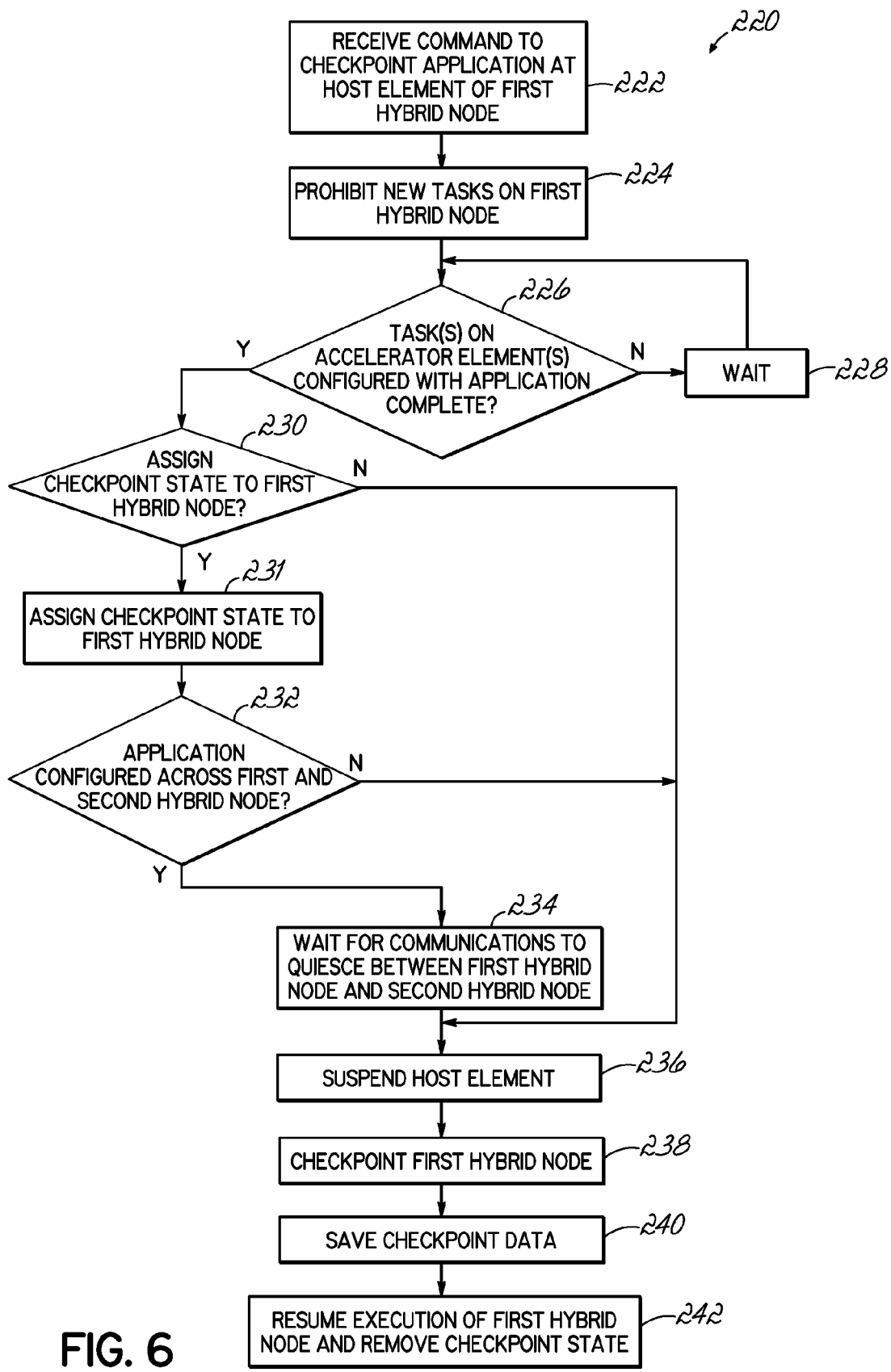
FIG. 6 is a flowchart illustrating one embodiment of blocks executable by the system of FIG. 1 to checkpoint the application configured across that system by checkpointing the host element and at least one accelerator element of the hybrid node of FIG. 2 separately.

FIG. 6 is a flowchart 220 illustrating blocks of program code executable by the system to checkpoint an application configured across at least one hybrid node consistent with one embodiment of the invention. During checkpointing, the application may checkpoint at least a portion of a first hybrid node configured with the application, and in particular checkpoint the host element of the first hybrid node. As such, the program code may send, and the application configured on the host element of the first hybrid node may receive, a command to checkpoint the application (block 222). New tasks on the first hybrid node may also be prohibited by the program code and/or the host element (block 224). In some embodiments, the program code may instruct the host element to ignore new tasks in order to prohibit new tasks on the first hybrid node. In alternative embodiments, the program code may instruct the service node for the first hybrid node to prohibit new tasks on the first hybrid node. In further alternative embodiments, the host element may refuse to schedule new tasks on the accelerator elements in response to receiving the command. The program code may then determine if the accelerator elements configured with the application have completed their tasks (block 226). When the accelerator elements configured with the application have not completed their tasks ("No" branch of decision block 226), the program code may wait for a short period of time (block 228), such as for about ten milliseconds, before again determining if the accelerator elements configured with the application have completed their tasks (block 246).

When the accelerator elements configured with the application have completed their tasks ("Yes" branch of decision block 226), the program code may determine whether to assign a CHECKPOINT state to the first hybrid node (block 230). In some embodiments, the CHECKPOINT state is an indication that at least one accelerator element of a hybrid node is idle and that the host element of that hybrid node is attempting to checkpoint. In specific embodiments, a CHECKPOINT state is set for a hybrid node when that hybrid node is configured with only one application. As such, other nodes (e.g., a management node, a service node, I/O nodes, and/or hybrid nodes) configured with the same application as the first hybrid node may avoid communications with the first hybrid node while it is in the CHECKPOINT state. When the program code determines to assign the CHECKPOINT state to the first hybrid node ("Yes" branch of decision block 230), the program code may assign the CHECKPOINT state to the first hybrid node (block 231) and the program code may determine if the application is configured across at least two hybrid nodes (block 232). In some embodiments, the program code may determine if the application is configured across the first hybrid node and at least a second hybrid node (block 232). When the application is configured across the first and second hybrid nodes ("Yes" branch of decision block 232), the program code may wait for communications to quiesce between the first hybrid node and the second hybrid node (block 234).

When the program code determines not to assign the CHECKPOINT state to the first hybrid node (for example, when there is more than one application configured across the first hybrid node) ("No" branch of decision block 230), when the program code determines that the application is not configured across multiple hybrid nodes ("No" branch of decision block 232), or after the communications have quiesced between the first hybrid node and at least a second hybrid node (block 234), the program code may suspend the host element (block 236) and checkpoint the first hybrid node (block 238). In some embodiments, checkpointing the first hybrid node includes copying data associated with the host element of the first hybrid node, which may further include copying data associated with a memory and execution state of the host element. In those embodiments, checkpointing the host element may include copying data associated with at least one MTP of the host element, which may further include copying data associated with a memory (e.g., the cache memory) and execution state of at least one core of the at least one MTP. The data from the host element may be saved in a checkpoint file (block 240), which may be located in the service node for that first hybrid node or a file server of the system. In alternative embodiments, the data from the host element may be saved in a host element file, which may in turn be located in the service node for that first hybrid node or a file server of the system. After the checkpoint data is saved (block 240), the program code may resume execution of the first hybrid node element and remove the CHECKPOINT state (block 242), and in particular resume execution of the application configured on the host element and at least one accelerator element of the first hybrid node.

Figure 7:
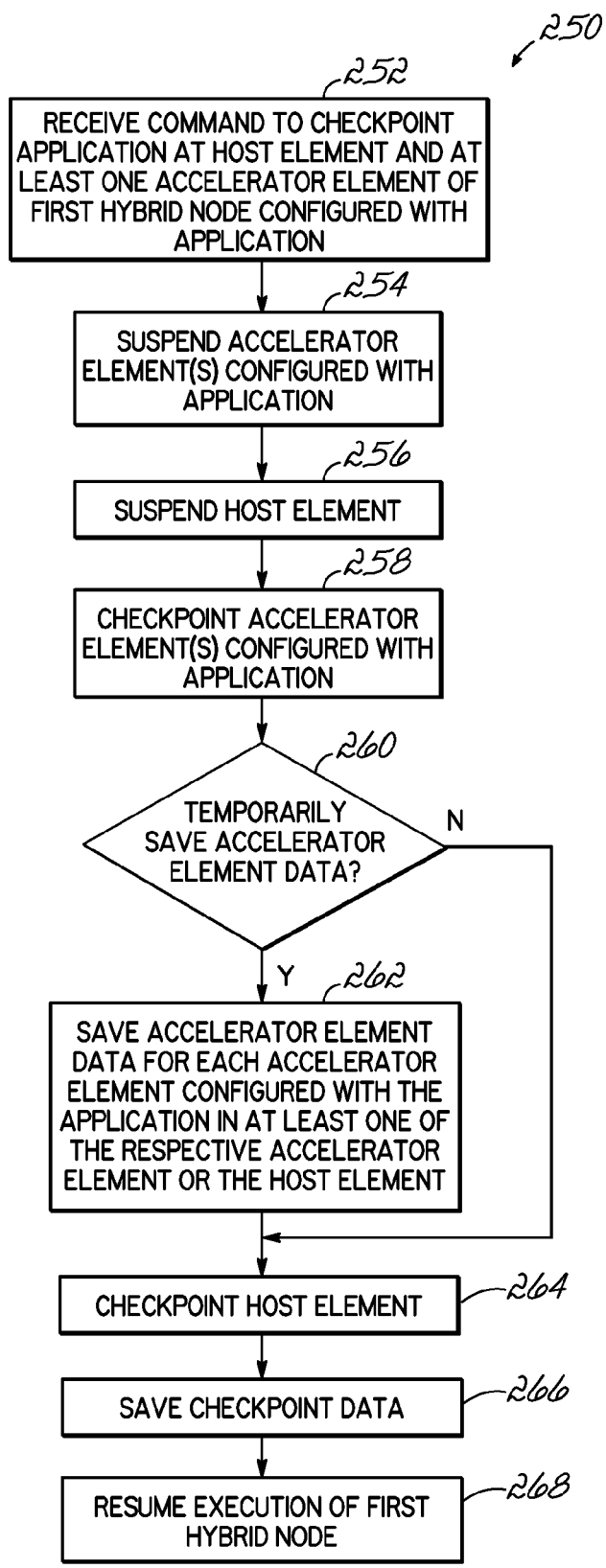
FIG. 7 is a flowchart illustrating an alternative embodiment of blocks executable by the system of FIG. 1 to checkpoint the application configured across that system by checkpointing the host element and at least one accelerator element of the hybrid node of FIG. 2 separately.

FIG. 7 is a flowchart 250 illustrating blocks of program code executable by the system to checkpoint an application configured across at least one hybrid node consistent with an alternative embodiment of the invention. During checkpointing, the program code may checkpoint the host element and at least one of the accelerator elements of the first hybrid node. As such, the program code may send, and the application configured on the host element and at least one accelerator element of the first hybrid node may receive, a command to checkpoint the application (block 252). In response to this command, accelerator elements configured with the application may be suspended (block 254) and the host element of the first hybrid node may be suspended (block 256). The program code may then checkpoint the accelerator elements of the first hybrid node configured with the application (block 258). In some embodiments, checkpointing the accelerator elements includes copying data associated with at least one accelerator element of the first hybrid node, which may further include copying data associated with an accelerator element memory and execution state of the at least one accelerator element. In those embodiments, checkpointing the accelerator elements may include copying data associated with at least one MEP of the at least one accelerator element, which may further include copying data associated with a memory (e.g., the cache memory) and execution state of the GPPE and at least one SPE of the at least one MEP. In response to copying the data, the program code may determine whether to temporarily save the accelerator element data (block 260). When the program code makes the determination to temporarily save the accelerator element data ("Yes" branch of block 260), the program code may temporarily store the accelerator element data in the respective accelerator element or the host element (block 262).

When the program code makes the determination not to temporarily save the accelerator element data ("No" branch of decision block 260), or after the program code temporarily saves the accelerator element data (block 262), the program code checkpoints the host element (block 264). In some embodiments, checkpointing the host element includes copying data associated with the host element of the first hybrid node, which may further include copying data associated with a memory and execution state of the host element. In those embodiments, checkpointing the host element may include copying data associated with at least one MTP of the host element, which may further include copying data associated with a memory (e.g., the cache memory) and execution state of at least one core of the at least one MTP. The program code may then save the checkpoint data for the at least one accelerator element and the host element (block 266). In some embodiments, saving the checkpoint data includes saving accelerator element data to an accelerator element file and saving host element data to a host element file. In alternative embodiments, saving the checkpoint data includes saving accelerator element data and host element data to a hybrid node element file. In some embodiments, the checkpoint data is saved in the service node for that first hybrid node, while in alternative embodiments the checkpoint data is saved in a file server of the system. In some embodiments, saving the checkpoint data includes removing temporarily saved accelerator element data. After saving the checkpoint data (block 266), the program code may resume execution of the first hybrid node (block 268), and in particular resume execution of the host element and at least one accelerator element of the first hybrid node.

Figure 8:
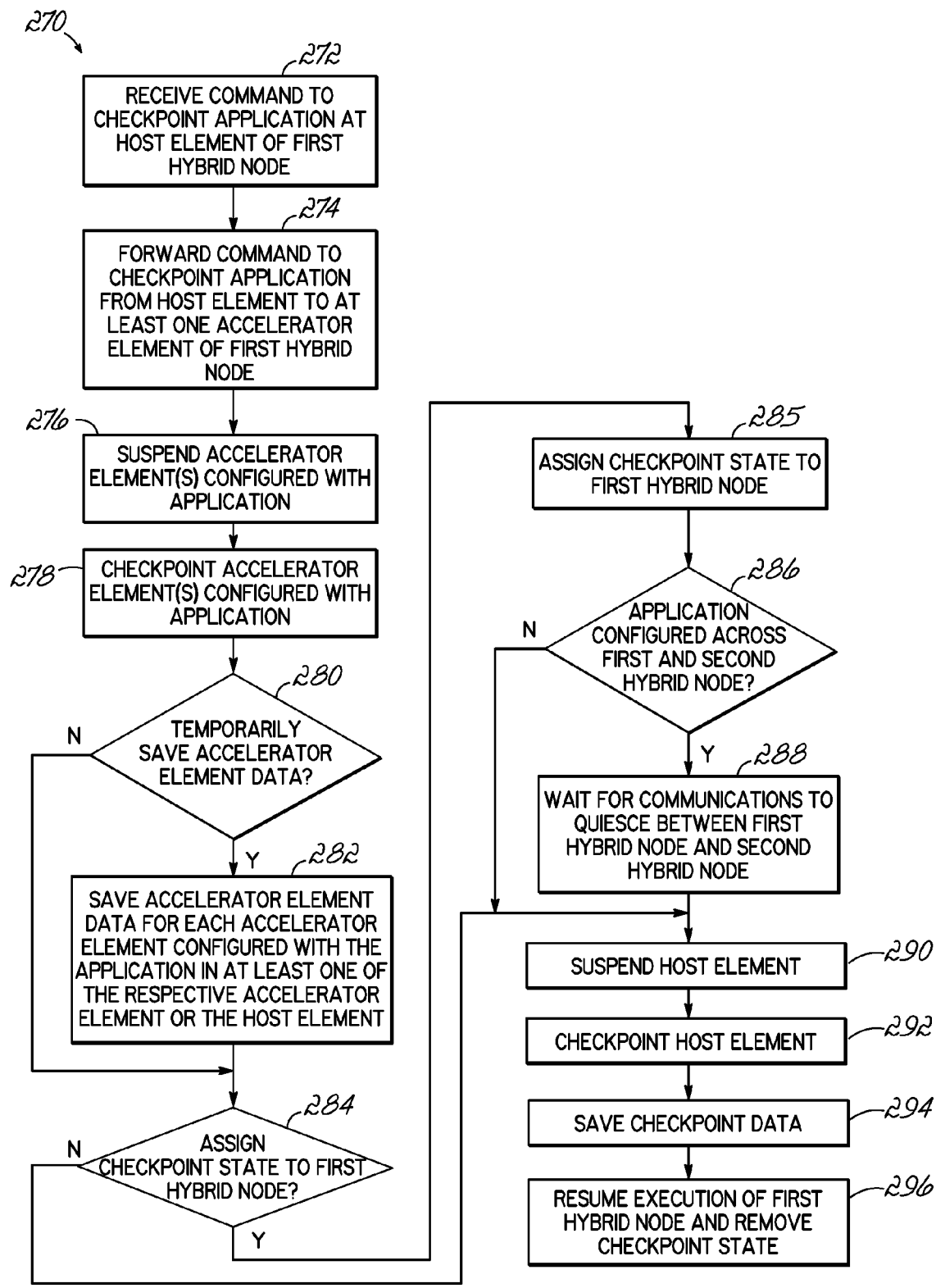
FIG. 8 is a flowchart illustrating a further alternative embodiment of blocks executable by the system of FIG. 1 to checkpoint the application configured across that system by checkpointing the host element and at least one accelerator element of the hybrid node of FIG. 2 separately.

FIG. 8 is a flowchart 270 illustrating blocks of program code executable by the system to checkpoint an application configured across at least one hybrid node consistent with another alternative embodiment of the invention. During checkpointing, the program code may checkpoint the host element and at least one of the accelerator elements of the first hybrid node. As such, the program code may send, and the application configured on the host element of the first hybrid node may receive, a command to checkpoint the application (block 272). In response to receiving the command to checkpoint the application, the host element may forward the command to at least one accelerator element of the first hybrid node configured with the application (block 274). In response to receiving the command, the accelerator elements configured with the application may be suspended (block 276) and those accelerator elements may be checkpointed (block 278). In some embodiments, checkpointing the accelerator elements includes copying data associated with at least one accelerator element of the first hybrid node, which may further include copying data associated with an accelerator element memory and execution state of the at least one accelerator element. In those embodiments, checkpointing the accelerator elements may include copying data associated with at least one MEP of the at least one accelerator element, which may further include copying data associated with a memory (e.g., the cache memory) and execution state of the GPPE and at least one SPE of the at least one MEP. In response to copying the data, the program code may determine whether to temporarily save the accelerator element data (block 280). When the program code makes the determination to temporarily save the accelerator element data ("Yes" branch of block 280), the program code may temporarily store the accelerator element data in the respective accelerator element or the host element (block 282).

When the accelerator elements data is not temporarily stored ("No" branch of block 280), or after the accelerator element data is temporarily stored (block 282), the program code may determine whether to assign a CHECKPOINT state to the first hybrid node (block 284). In some embodiments, the CHECKPOINT state is an indication that at least one accelerator element of a hybrid node has been checkpointed and that the host element of that hybrid node is attempting to checkpoint. In specific embodiments, a CHECKPOINT state is set for a hybrid node when that hybrid node is configured with only one application. As such, other nodes (e.g., a management node, a service node, I/O nodes, and/or hybrid nodes) configured with the same application as the first hybrid node may avoid communications with the first hybrid node while it is in the CHECKPOINT state. When the program code determines to assign the CHECKPOINT state to the first hybrid node ("Yes" branch of decision block 284), the program code assigns the CHECKPOINT state to the first hybrid node (block 285) and the program code may determine if the application is configured across at least two hybrid nodes (block 286). In some embodiments, the program code may determine if the application is configured across the first hybrid node and at least a second hybrid node (block 286). When the application is configured across the first and second hybrid nodes ("Yes" branch of decision block 286), the program code may wait for communications to quiesce between the first hybrid node and the second hybrid node (block 288).

When the program code determines not to assign the CHECKPOINT state to the first hybrid node (for example, when there is more than one application configured across the first hybrid node) ("No" branch of decision block 284), when the program code determines that the application is not configured across multiple hybrid nodes ("No" branch of decision block 286), or after the communications have quiesced between the first hybrid node and at least a second hybrid node (block 288), the program code may suspend the host element (block 290) and checkpoint the host element of the first hybrid node (block 292). In some embodiments, checkpointing the host element includes copying data associated with the host element of the first hybrid node, which may further include copying data associated with a memory and execution state of the host element. In those embodiments, checkpointing the host element may include copying data associated with at least one MTP of the host element, which may further include copying data associated with a memory (e.g., the cache memory) and execution state of at least one core of the at least one MTP.

The program code may then save the checkpoint data for the at least one accelerator element and the host element (block 294). In some embodiments, saving the checkpoint data includes saving accelerator element data to an accelerator element file and saving host element data to a host element file. In alternative embodiments, saving the checkpoint data includes saving accelerator element data and host element data to a hybrid node element file. In some embodiments, the checkpoint data is saved in the service node for that first hybrid node, while in alternative embodiments the checkpoint data is saved in a file server of the system. In some embodiments, saving the checkpoint data includes removing temporarily saved accelerator element data. After saving the checkpoint data (block 294), the program code may resume execution of the first hybrid node and remove the CHECKPOINT state (block 296), and in particular resume execution of the host element and at least one accelerator element of the first hybrid node.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the present invention. Accordingly, departures may be made from such details without departing from the spirit or scope of applicants' general inventive concept.

What is claimed is:

1. A method of checkpointing an application in a parallel computing system of the type that includes a plurality of hybrid nodes, each hybrid node including a host element and a plurality of accelerator elements, each host element including at least one multithreaded processor, the method comprising, in a first hybrid node among the plurality of hybrid nodes:
   executing at least a portion of the application in the host element and at least one accelerator element; and
   in response to receiving a command to checkpoint the application, checkpointing the host element separately from the at least one accelerator element.

2. The method of claim 1, wherein checkpointing the host element includes waiting to complete at least one task of the at least one accelerator element prior to saving checkpoint data for the host element.

3. The method of claim 2, wherein checkpointing the host element includes prohibiting a new task from being scheduled on the at least one accelerator element prior to saving checkpoint data for the host element.

4. The method of claim 2, wherein waiting to complete the at least one task of the at least one accelerator element includes monitoring the at least one accelerator element to determine when the at least one accelerator element has completed the at least one task.

5. The method of claim 4, wherein checkpointing the host element is performed in response to the completion of the at least one task of the at least one accelerator element.

6. The method of claim 1, wherein checkpointing the host element includes quiescing communications between the host element and a second host element of a second hybrid node among the plurality of hybrid nodes prior to saving checkpoint data for the host element of the first hybrid node.

7. The method of claim 6, wherein checkpointing the host element includes waiting to complete the at least one task of the at least one accelerator element of the first hybrid node prior to saving checkpoint data for the host element of the first hybrid node.

8. The method of claim 1, wherein checkpointing the host element includes checkpointing the at least one accelerator element prior to saving checkpoint data for the host element.

9. The method of claim 8, wherein checkpointing the at least one accelerator element includes temporarily saving checkpoint data for the at least one accelerator element in the host element.

10. The method of claim 8, wherein checkpointing the at least one accelerator element includes temporarily saving checkpoint data for the at least one accelerator element in the respective accelerator element.

11. The method of claim 8, wherein checkpointing the at least one accelerator element includes suspending the execution of the application on the at least one accelerator element prior to saving checkpoint data for the at least one accelerator element.

12. The method of claim 11, wherein checkpointing the host element further includes quiescing communications between the host element and a second host element of a second hybrid node among the plurality of hybrid nodes prior to saving checkpoint data for the host element of the first hybrid node.

13. The method of claim 12, wherein checkpointing the host element further includes suspending the execution of the application on the host element of the first hybrid node in response to receiving the command to checkpoint the application and prior to saving checkpoint data for the host element of the first hybrid node.

14. The method of claim 1, wherein checkpointing the host element further includes suspending the execution of the application on the host element in response to receiving the command to checkpoint the application and prior to saving checkpoint data for the host element.

15. The method of claim 1, wherein checkpointing the host element includes saving checkpoint data for the host element in a host element checkpoint file.

16. The method of claim 1, wherein checkpointing the host element separately from the at least one accelerator element in response to the command includes saving checkpoint data for the at least one accelerator element in an accelerator element checkpoint file.

17. The method of claim 1, wherein checkpointing the host element separately from the at least one accelerator element in response to the command includes saving checkpoint data for the host element and the at least one accelerator element in a hybrid node checkpoint file.

18. The method of claim 1, wherein checkpointing the host element includes assigning a state value to the first hybrid node that indicates that the host element is attempting to quiesce communications between the host element of the first hybrid node and a second host element of a second hybrid node among the plurality of host elements prior to saving checkpoint data for the host element of the first hybrid node.

19. The method of claim 1, wherein checkpoint data for the host element includes the state data and memory of the at least one multithreaded processor of the host element, and wherein checkpoint data for the at least one accelerator element includes the state data and memory of a general purpose processing element and at least one synergistic processing element of at least one multi-element processor of the at least one accelerator element.

20. The method of claim 1, wherein each accelerator element includes at least one multi-element processor, each multi-element processor further including at least one general purpose processing element and a plurality of synergistic processing elements.

21. A method of checkpointing an application in a parallel computing system of the type that includes a plurality of hybrid nodes, each hybrid node including a host element and a plurality of accelerator elements, each host element including at least one multithreaded processor, the method comprising:
in a first hybrid node among the plurality of hybrid nodes, executing at least a portion of the application in the host element and at least one accelerator element of the first hybrid node;
in the first hybrid node, waiting to complete at least one first task of the at least one accelerator element of the first hybrid node in response to a command to checkpoint the application;
in the first hybrid node, waiting to complete the at least one second task of the host element of the first hybrid node in response to the command;
checkpointing the at least one accelerator element of the first hybrid node in response to completing the at least one first task of the at least one accelerator element of the first hybrid node; and
checkpointing the host element of the first hybrid node in response to completing the at least one second task of the host element of the first hybrid node and in response to quiescing communications between the host element of the first hybrid node and a second host element of a second hybrid node among the plurality of hybrid nodes.

22. The method of claim 21, wherein each accelerator element includes at least one multi-element processor, each multi-element processor further including at least one general purpose processing element and a plurality of synergistic processing elements.

23. A hybrid node, comprising:
a host element, the host element including at least one multithreaded processor and a memory, the host element executing at least a portion of an application;
at least one accelerator element, each accelerator element including at least one processor and a memory, the at least one accelerator element executing at least a portion of the application; and
program code configured to be executed by the hybrid node to checkpoint the application, the program code further configured to checkpoint the host element separately from the at least one accelerator element in response to receiving a command to checkpoint the application.

24. A parallel computing system comprising the hybrid node of claim 23.

25. A program product, comprising:
program code configured upon execution to checkpoint an application of a parallel computing system of the type that includes a plurality of hybrid nodes, each hybrid node including a host element and a plurality of accelerator elements, the host element including at least one multithreaded processor, the host element and the at least one accelerator element executing at least a portion of the application, the program code further configured to, in a first hybrid node among the plurality of hybrid nodes, checkpoint the host element separately from the at least one accelerator element in response to receiving a command to checkpoint the application; and
a computer readable medium bearing the program code.

* * * * *